US009884393B2

(12) United States Patent
Roberts et al.

(10) Patent No.: US 9,884,393 B2
(45) Date of Patent: Feb. 6, 2018

(54) REPAIR METHODS UTILIZING ADDITIVELY MANUFACTURING FOR ROTOR BLADES AND COMPONENTS

(71) Applicant: General Electric Company, Schenectady, NY (US)

(72) Inventors: Herbert Chidsey Roberts, Middletown, OH (US); Richard William Albrecht, Jr., Fairfield, OH (US); Michael John McCarren, South Lebanon, OH (US); Peter Andrew Flynn, Delmar, NY (US); Michael Francis Xavier Gigliotti, Jr., Glenville, NY (US); Eric Alan Estill, Morrow, OH (US)

(73) Assignee: General Electric Company, Schenectady, NY (US)

( * ) Notice: Subject to any disclaimer, the term of this patent is extended or adjusted under 35 U.S.C. 154(b) by 205 days.

(21) Appl. No.: 14/887,481

(22) Filed: Oct. 20, 2015

(65) Prior Publication Data

US 2017/0106482 A1    Apr. 20, 2017

(51) Int. Cl.

| B23P 6/00  | (2006.01) |
| F01D 5/00  | (2006.01) |
| B22F 3/105 | (2006.01) |
| F01D 5/28  | (2006.01) |
| B33Y 10/00 | (2015.01) |
| B22F 7/06  | (2006.01) |

(52) U.S. Cl.
CPC ............ *B23P 6/007* (2013.01); *B22F 3/1055* (2013.01); *F01D 5/005* (2013.01); *F01D 5/288* (2013.01); *B22F 2007/068* (2013.01); *B33Y 10/00* (2014.12); *F05D 2230/80* (2013.01); *F05D 2230/90* (2013.01); *F05D 2240/307* (2013.01); *F05D 2260/36* (2013.01); *F05D 2300/10* (2013.01); *F05D 2300/20* (2013.01); *Y02P 10/295* (2015.11)

(58) Field of Classification Search
CPC .................................................. B22F 3/1055
USPC ....................................................... 478/678
See application file for complete search history.

(56) References Cited

U.S. PATENT DOCUMENTS

| 1,937,865 | A   | 12/1933 | Baker              |
|-----------|-----|---------|--------------------|
| 2,790,656 | A   | 4/1957  | Cook               |
| 4,966,421 | A   | 10/1990 | Mengel             |
| 5,172,504 | A   | 12/1992 | De Maat et al.     |
| 5,269,057 | A   | 12/1993 | Mendhem            |
| 5,626,556 | A   | 5/1997  | Tobler et al.      |
| 5,645,193 | A   | 7/1997  | Gentile et al.     |
| 5,945,193 | A   | 8/1999  | Pollard et al.     |
| 6,471,800 | B2  | 10/2002 | Jang et al.        |
| 6,521,331 | B1* | 2/2003  | Sikorski ................ B29C 70/885 |
|           |     |         |                    264/332 |
| 6,905,100 | B2  | 6/2005  | Franck et al.      |
| 7,431,976 | B2  | 10/2008 | Hermann et al.     |
| 8,114,242 | B2  | 2/2012  | Cai et al.         |
| 2007/0086892 | A1 | 4/2007 | Tomko et al.      |
| 2008/0193709 | A1 | 8/2008 | Han               |
| 2009/0293165 | A1 | 12/2009 | Arnold            |
| 2011/0033285 | A1 | 2/2011 | Turi et al.       |
| 2011/0052412 | A1 | 3/2011 | Ader et al.       |
| 2013/0045093 | A1 | 2/2013 | Wunderlich et al. |
| 2013/0247614 | A1 | 9/2013 | Thomas            |
| 2013/0276456 | A1 | 10/2013 | Propheter-Hinckley et al. |
| 2014/0011912 | A1 | 1/2014 | Petry et al.      |
| 2014/0099476 | A1 | 4/2014 | Subramanian et al. |
| 2014/0127005 | A1 | 5/2014 | Schreiber         |
| 2014/0308539 | A1 | 10/2014 | Witz et al.      |
| 2015/0021379 | A1 | 1/2015 | Albrecht et al.   |
| 2015/0224607 | A1 | 8/2015 | Bruck et al.      |
| 2017/0106482 | A1* | 4/2017 | Roberts ................ B23P 6/007 |

FOREIGN PATENT DOCUMENTS

| DE | 202 21 061 U1    | 2/2005  |
| DE | 10 2011 084 153 A1 | 4/2013 |
| EP | 1445426 A2       | 8/2004  |
| EP | 2204547 A1       | 7/2010  |
| EP | 2 719 484 A1     | 4/2014  |
| EP | 2 777 867 A1     | 9/2014  |

(Continued)

OTHER PUBLICATIONS

European Search Report and Opinion issued in connection with related EP Application No. 16194274.3 dated Feb. 16, 2017.
GE Related Case Form.
U.S. Appl. No. 14/887,459, filed Oct. 20, 2015, Roberts, et al.
U.S. Appl. No. 14/887,509, filed Oct. 20, 2015, Roberts, et al.
U.S. Appl. No. 14/887,531, filed Oct. 20, 2015, Roberts, et al.
U.S. Appl. No. 14/887,556, filed Oct. 20, 2015, Roberts, et al.
Extended European Search Report and Opinion issued in connection with corresponding EP Application No. 16194267.7 dated Mar. 30, 2017.
Extended European Search Report and Opinion issued in connection with related EP Application No. 16194269.3 dated Mar. 30, 2017.
Extended European Search Report and Opinion issued in connection with related EP Application No. 16194270.1 dated Mar. 30, 2017.

(Continued)

*Primary Examiner* — Terressa Boykin
(74) *Attorney, Agent, or Firm* — General Electric Company; Brian P. Overbeck (57) ABSTRACT

Methods for repairing surface of a metal substrate are provided, which can include preparing the surface of the metal substrate for repair; melt attaching a base layer onto the surface of the metal substrate; fusing a plurality of first layers of a first material via additive manufacturing to the base coating; forming an interlocking transition zone via additive manufacturing from the first material and a second material; and fusing a plurality of second layers of the second material via additive manufacturing on the interlocking transition zone. The interlocking transition zone can have a plurality of projections alternately extending from the plurality of first layers and the plurality of second layers, respectively, to undetachably couple the plurality of first layers to the plurality of second layers. A repaired metal substrate is also provided.

20 Claims, 6 Drawing Sheets

(56) References Cited

FOREIGN PATENT DOCUMENTS

| EP | 2 815 823 A1 | 12/2014 |
| EP | 3 050 651 A1 | 8/2016 |
| WO | 2009157817 A1 | 12/2009 |
| WO | 2014158284 A2 | 10/2014 |

OTHER PUBLICATIONS

Extended European Search Report and Opinion issued in connection with related EP Application No. 16194271.9 dated Apr. 4, 2017.
Office Action issued in connection with related CA Application No. 2945104 dated Jul. 25, 2017.
Office Action issued in connection with corresponding CA Application No. 2945233 dated Jul. 27, 2017.
Non-Final Rejection towards U.S. Appl. No. 14/887,459 dated Aug. 3, 2017.

* cited by examiner

REPAIR METHODS UTILIZING ADDITIVELY MANUFACTURING FOR ROTOR BLADES AND COMPONENTS

FIELD OF THE INVENTION

This invention relates generally to gas turbine engines and more particularly to the repair of turbine nozzle segments used in such engines.

BACKGROUND OF THE INVENTION

In manufacturing, it is often desirable to join two or more components to create a single part. However, current methods of joining components, whether these components are made from the same or dissimilar materials, often result in poor mechanical properties.

For example, prior art methods of joining two components may include metal-melting processes such as welding or brazing, using mechanical fasteners such as rivets or screws, or applying and curing a structural adhesive. These joints can exhibit poor physical properties and provide a weak mechanical bond, such as poor shear bonding or adhesion. These joints may also be prone to crack initiation and propagation along the material transition line or plane due to concentrated stresses in those regions.

In addition, in some applications, it is desirable to have a joint that allows some relative movement between joined components. For example, a joint between two or more components that is not pliant or flexible may exhibit issues related to fatigue durability, impact resistance, and overall lifetime of the joint. In cases where the components or joining material have different coefficients of thermal expansion, a joint that allows no relative movement cannot compensate for thermal growth mismatch, thus leading to failure of the joint in certain temperature environments.

Additionally, cooling holes that extend between joined components may be desirable. However, depending on the orientation and configuration of the joint and components, it may not be possible to form cooling holes using current methods, such as drilling or machining, without compromising the integrity of the joint. It may not be possible to create a cooling hole, for example, where the hole is internal to the joint itself or where drilling a hole might otherwise weaken the joint.

Accordingly, a method of joining two or more components with improved structural integrity is desirable. More particularly, a method for forming a joint that allows for relative movement between components or the inclusion of cooling holes if desired, while still providing a strong mechanical bond would be particularly useful.

BRIEF DESCRIPTION OF THE INVENTION

Aspects and advantages of the invention will be set forth in part in the following description, or may be obvious from the description, or may be learned through practice of the invention.

Methods are generally provided for repairing surface of a metal substrate. In one embodiment, the method includes preparing the surface of the metal substrate for repair; melt attaching a base layer onto the surface of the metal substrate; fusing a plurality of first layers of a first material via additive manufacturing to the base coating; forming an interlocking transition zone via additive manufacturing from the first material and a second material; and fusing a plurality of second layers of the second material via additive manufacturing on the interlocking transition zone. The interlocking transition zone has a plurality of projections alternately extending from the plurality of first layers and the plurality of second layers, respectively, to undetachably couple the plurality of first layers to the plurality of second layers.

A repaired metal substrate is also generally provided. In one embodiment, the repaired metal substrate includes a metal substrate defining a surface; a base coating attached to the surface of the metal substrate; a first component attached to the base coating, with the first component including a plurality of fused layers of a first material; a second component comprising a plurality of fused layers of a second material; and an interlocking transition zone comprising a plurality of projections alternately extending from the first component and the second component, respectively, to undetachably couple the first component and the second component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Additive manufacturing technology enables fabrication of complex objects by building objects point-by-point, layer-by-layer, typically in a vertical (Y) direction. Although the discussion below refers to the addition of material, one skilled in the art will appreciate that the methods and structures disclosed herein may be practiced with any additive manufacturing technique or technology. For example, embodiments of the present invention may use layer-additive processes, layer-subtractive processes, or hybrid processes. In some embodiments, the method and structure disclosed herein may provide two or more components joined by an interlocking transition zone 10 and formed by successively depositing layers of one or more materials.

Embodiments of the present disclosure provide methods and structures for joining two or more components using additive manufacturing technology. In this regard, multiple components may be created that are independent entities, but that are created with interlocking features in their construction to effectively form mechanical "roots" that reach across a bonding region, thereby resisting disassembly and carrying structural loading across the transition zone. The resulting joints may be planar or non-planar and may exhibit improved mechanical strength and adhesion. The interlocking material transition zone can also be used, for example, to secure a highly impact resistant protective coating layer to a base material. In addition, the interlocking features may be spaced apart to permit a small range of motion between the components, and the joints may have integrated cooling holes or passageways.

Figure 1:
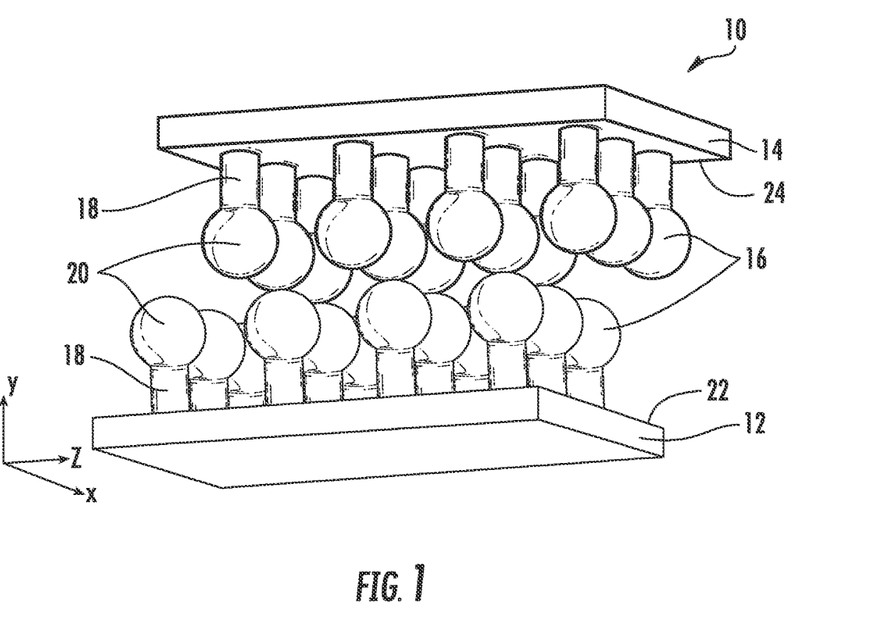
FIG. 1 is a perspective view of an interlocking transition zone in accordance with an example embodiment of the present disclosure, where the first and second components are shown separated to provide a clear view of the projections.

Referring now to the figures, FIG. 1 shows a perspective view of an interlocking transition zone 10 in accordance with an example embodiment of the present disclosure, where a first component 12 and a second component 14 are shown separated to provide a clear view of a plurality of projections 16. As shown, the interlocking transition zone 10 may extend in the in a planar region defined by the X-Z plane. Notably, only the interlocking transition zone 10 is shown in the figures, but one skilled in the art will appreciate that the first component 12 and second component 14 can be any simple or complex object manufactured using additive manufacturing technology. In addition, the first component 12 and second component 14, and the interlocking transition zone 10 connecting them, can be scaled to any size. For example, each projection 16 might range from several nanometers in cross-section to several centimeters or larger. Given its versatility and scalability, the presently disclosed method and structure for joining two or more components using additive manufacturing technology can be practiced in various applications and fields of technology.

Figure 2:
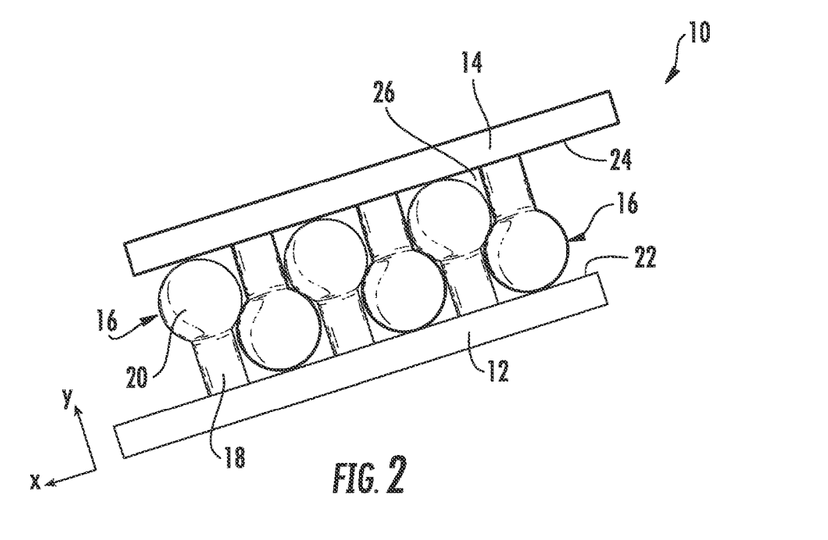
FIG. 2 is a side view of an interlocking transition zone with shaft and knob projections according to an example embodiment.

FIG. 2 is a side view of an interlocking transition zone 10 with shaft 18 and knob 20 projections 16 according to one exemplary embodiment. As shown, each of the first component 12 and second component 14 comprises a plurality of projections 16 extending from a first component surface 22 and a second component surface 24, respectively. Although the illustrated embodiment shows each projection 16 extending in a substantially perpendicular direction, one skilled in the art will appreciate that in other embodiments, each projection 16 may be fabricated at any angle with respect to the component surfaces 22, 24. Each projection 16 comprises a shaft 18 with a knob 20 located at its distal end. In the embodiments illustrated in FIGS. 1 and 2, the shaft 18 is cylindrical and the knob 20 is spherical. However, in some embodiments, the shaft 18 may instead have a cross-section that is square, rectangular, elliptical, irregularly shaped, or any other suitable shape, and may be at common or at different lengths. Similarly, the knob 20 may be square, oblong, or any other suitable shape.

The plurality of projections 16 may alternately extend from the first component 12 and the second component 14 to form an interlocking transition zone 10 extending in both the longitudinal (X) and lateral (Z) direction. In some embodiments, the diameter of knob 20 is larger than the diameter of shaft 18, and the shafts 18 are spaced along the first component 12 and second component 14 such that the knob 20 may fit between adjacent shafts 18. In this manner, the plurality of projections 16 form an interlocking transition zone 10 that mechanically couples the first component 12 and the second component 14. Because the interlocking transition zone 10 may be printed layer-by-layer using additive manufacturing, the resulting interlocking transition zone 10 undetachably couples the first component 12 and the second component 14. In this regard, the first component 12 and the second component 14 are joined such that they may not be separated through non-destructive means. In some embodiments, at least a portion of adjacent projections 16 may prevent relative motion between the components 12, 14. As explained in more detail below, in other embodiments the spacing of the shafts 18 may be adjusted to allow for relative movement of the plurality of projections 16 and provide some flexibility to the interlocking transition zone 10.

Figure 3:
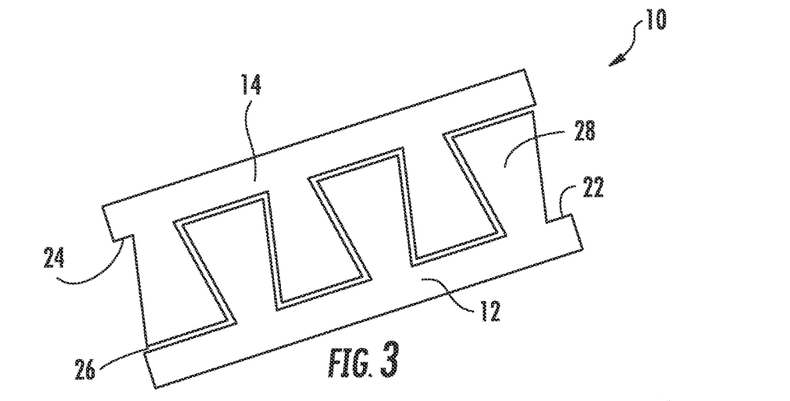
FIG. 3 is a side view of an interlocking transition zone with trapezoidal projections according to an example embodiment.

In some example embodiments, the projections 16 can have a different shape. In this regard, the plurality of projections 16 may be irregularly shaped, and each projection 16 may either fill the entire area between adjacent projections 16, or may leave gaps or small interstices 26. For example, as shown in FIG. 3, the projections 16 may be trapezoidal projections 28. In this regard, each trapezoidal projection 28 has a narrow cross-section proximate to the first component 12 or second component 14, respectively. The cross-sectional area of the trapezoidal projection 28 gets larger as the trapezoidal projection 28 extends away from the first component 12 or second component 14 toward a distal end of the trapezoidal projection 28, where the cross-section is the largest.

Figure 4:
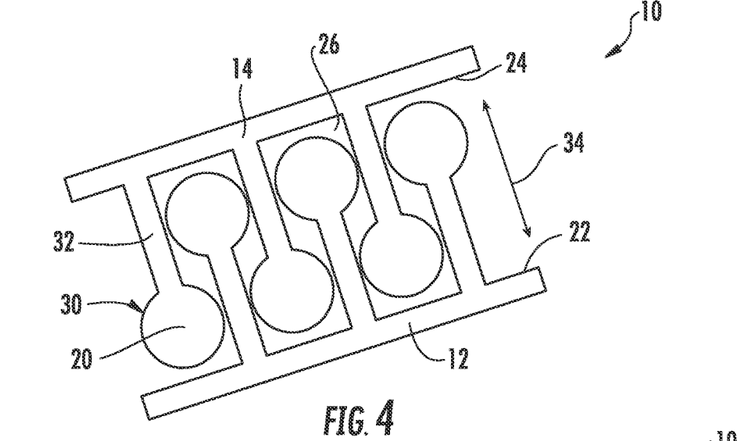
FIG. 4 is a side view of an interlocking transition zone with elongated shaft and knob projections according to an example embodiment.

Referring now specifically to the embodiment of FIG. 4, the plurality of projections 16 may be elongated projections 30. In this regard, the elongated projections 30 may have elongated shafts 32, or may be otherwise fabricated to allow some relative motion between the first component 12 and the second component 14. For example, the elongated shafts 32 may allow the first component 12 and second component 14 to slide relative to each other in the Z-direction (as indicated by arrow 34) until the adjacent knobs 20 come into contact with each other. Similarly, in some embodiments, the spacing of the plurality of projections 16 may be increased so as to permit a small range of motion in the X, Y, and Z planes and rotations about the X, Y, and Z axis. As one skilled in the art will appreciate, the size, shape, and spacing of the plurality of projections 16 may be adjusted to permit or restrict motion as needed for any particular application.

Figure 5:
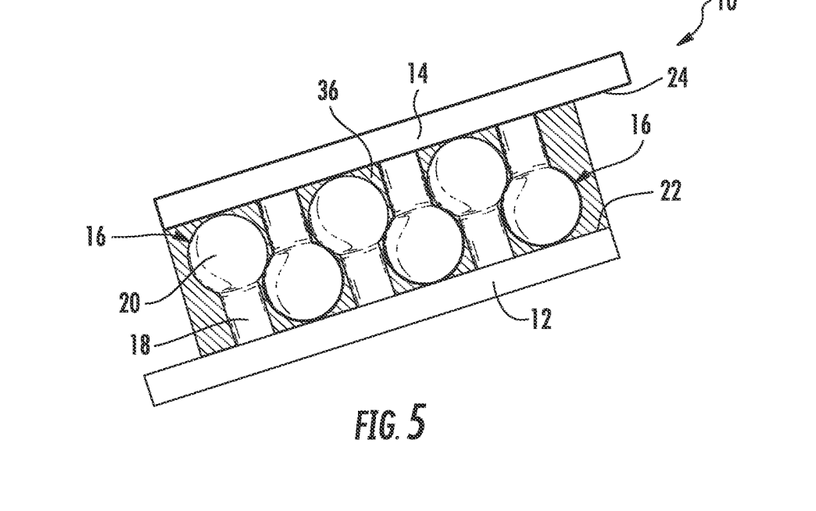
FIG. 5 is a side view of an interlocking transition zone with shaft and knob projections, where a braze material is used as an adhesive between the first and second component according to an example embodiment.

Now referring specifically to FIG. 5, some embodiments of the interlocking transition zone 10 may have an adhesive 36 or other material disposed between the first component surface 22 and the second component surface 24 in order to further ensure a strong bond. This adhesive layer 36 may be, for example, an epoxy or cured resin, or the joint may be made by introduced a brazing filler material between the first component 12 and second component 14. Alternatively, the adhesive layer 36 may be another additively manufactured layer between the first component 12 and the second component 14, and may be made from any material suitable for use in an additive manufacturing process, as discussed below. In this manner, the adhesive layer 36 may improve the mechanical bond strength of the interlocking transition zone 10.

Figure 6:
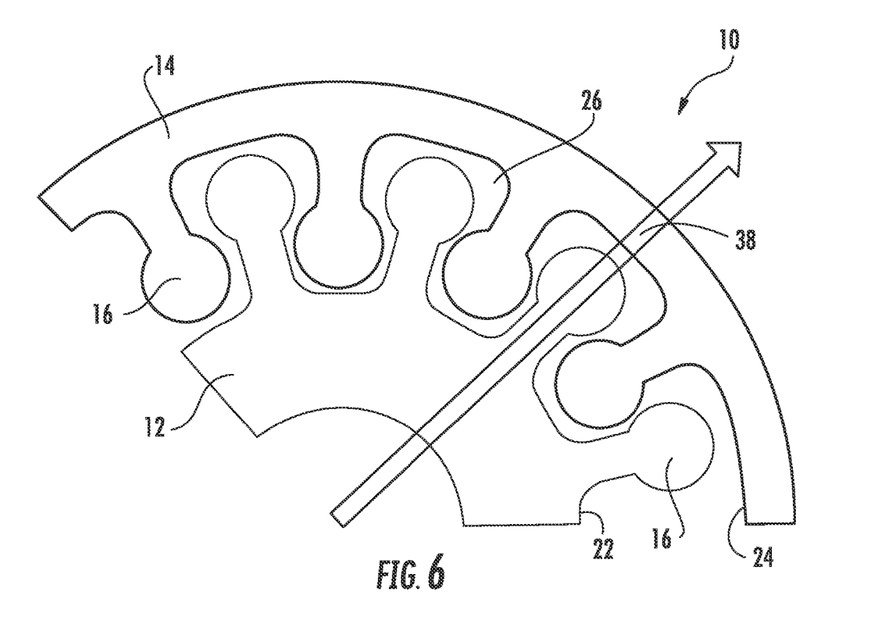
FIG. 6 is a side view of a non-planar interlocking transition zone with a cooling hole extending through according to an example embodiment.

In some cases, it is desirable to include cooling holes 38 that extend through the interlocking transition zone 10 to provide for communication of cooling fluid between the first component 12 and second component 14 and/or within the interlocking transition zone 10. FIG. 6 shows a side view of a non-planar interlocking transition zone 10 with an integrated cooling hole 38. The cooling hole 38 may be formed through the components by selectively depositing material during the additive manufacturing process to form the passageway or cooling hole 38. The cooling holes 38 may extend internally through an interlocking transition zone 10, such that they are self-contained and not exposed to any exterior surface of the joined components. In addition, the cooling holes 38 may be of any shape or size, and may be placed in any location. For example, although the cooling holes 38 depicted in FIG. 6 are linear and extend straight through the interlocking transition zone 10 from the first component 12 to the second component 14, the cooling holes 38 may instead be curved or serpentine.

The additive manufacturing process disclosed herein allows the first component 12 and second component 14 to be made of any of a variety of materials. Each component may be made of the same material or of a different material. In fact, even a single component may comprise multiple layers of different materials. In some embodiments, the first component 12 may be a first part and the second component 14 may be a second part, such that the interlocking transition zone 10 creates a multi-part assembly. Moreover, one skilled in the art will appreciate that the method and structure described herein need not be limited to two components, but may be used to join more than two components. In some embodiments, the first component 12 may be a base material and the second component 14 may be a protective coating. For example, the second component 14 may be a thermal barrier coating or a bond coat of thermal barrier coating to provide improved thermal durability to the first component 12. In other embodiments, the protective coating may be a very durable material exhibiting high impact resistance. In this manner, the protective coating may protect the underlying component from impact damage and extend its lifetime.

As indicated above, the second component 14 may be a protective coating, such as a thermal barrier coating (TBC) system or an environmental barrier coating (EBC) system. Such TBC and EBC systems may generally include a bond layer covering the outer surface of the first component 12 and a thermal barrier layer disposed over the bond layer. As is generally understood, the bond layer may be formed from an oxidation resistant metallic material designed to inhibit oxidation and/or corrosion of the underlying first component 12. For instance, in several embodiments, the bond layer may be formed from a material comprising "MCrAlY," where "M" represents iron, nickel or cobalt, or from an aluminide or noble metal aluminide material (e.g., platinum aluminide). Similarly, the thermal barrier layer may be formed from a temperature resistant material in order to increase the operating temperature capability of the first component 12. For example, in several embodiments, the thermal barrier layer may be formed from various known ceramic materials, such as zirconia partially or fully stabilized by yttrium oxide, magnesium oxide or other noble metal oxides.

Moreover by using the methods and structures disclosed above to create an interlocking transition zone 10, the bond layer of the TBC and EBC systems may be eliminated altogether. In this regard, the bond layer is typically used in TBC and EBC systems in order to provide an intermediate layer between the first component 12 and the thermal barrier coating to compensate for thermal mismatching—i.e., the first component 12 and thermal barrier coating may have different coefficients of thermal expansion, causing stresses as the materials grow at different rates when placed in high temperature environments. The bond layer provides additional mechanical strength and adhesion to ensure the thermal mismatching does not result in bonding region failure. However, as discussed above, the plurality of projections 16 form an interlocking transition zone 10 that provides a strong mechanical bond and improved adhesion between components. Therefore, if an interlocking transition zone 10 couples a protective thermal barrier coating to the first component 12, the bond layer may be eliminated altogether and the assembly can still withstand high temperature environments.

In addition, one skilled in the art will appreciate that a variety of materials and methods for bonding those materials may be used and are contemplated as within the scope of the present disclosure. For example, the material may be plastic, metal, concrete, ceramic, polymer, epoxy, photopolymer resin, or any other suitable material that may be in solid, liquid, powder, sheet material, or any other suitable form. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting process. One skilled in the art will appreciate other methods of fusing materials to make a component by additive manufacturing are possible, and the presently disclosed subject matter may be practiced with those methods.

In some embodiments, the first material and the second material have different coefficients of thermal expansion. In such embodiments, it may be desirable to configure the plurality of projections 16 to allow some relative movement, thereby reducing the likelihood of failure due to concentrated stresses resulting from thermal growth mismatch.

Additive manufacturing technology enables the creation of multiple components that are independent entities, but that are created with interlocking features in their construction to limit their range of motion and/or disassembly. In this regard, two or more independent components can be fabricated with interlocking features that effectively form mechanical "roots" that reach across a interlocking transition zone 10, resist disassembly, and have the capacity to carry structural loading across the interlocking transition zone 10. The ability to effectively join two or more components using additive manufacturing technology introduces a wide range of planar or non-planar joints, and can enable the creation of unique assemblies.

The interlocking material transition zone 10 can provide technical and commercial advantages over the prior art. Joints created using the described method have improved mechanical strength, exhibiting improved shear bonding between regions of different function, composition, or microstructures, and enhanced adhesion at the micro or macro scale. The interlocking material transition zone 10 can also be used, for example, to secure a highly impact resistant protective coating layer to a base material. Bond layer versatility is also improved in that the components may be made of the same or dissimilar material, and the joints may be planar or non-planar. In addition, the interlocking features may be spaced apart to permit a small range of motion between the components, and the joints may have integrated cooling holes or passageways.

The above-described apparatus and method of joining two or more components using additive manufacturing can be used in a variety of applications and in a variety of industries. For example, components of a gas turbine engine may be constructed using this process. A few examples of components of a gas turbine engine that may be constructed using the above described method are discussed below. However, as one skilled in the art will appreciate, these components are only exemplary, and other applications and uses of the described additive manufacturing technology are possible and within the scope of the invention.

Figure 7:
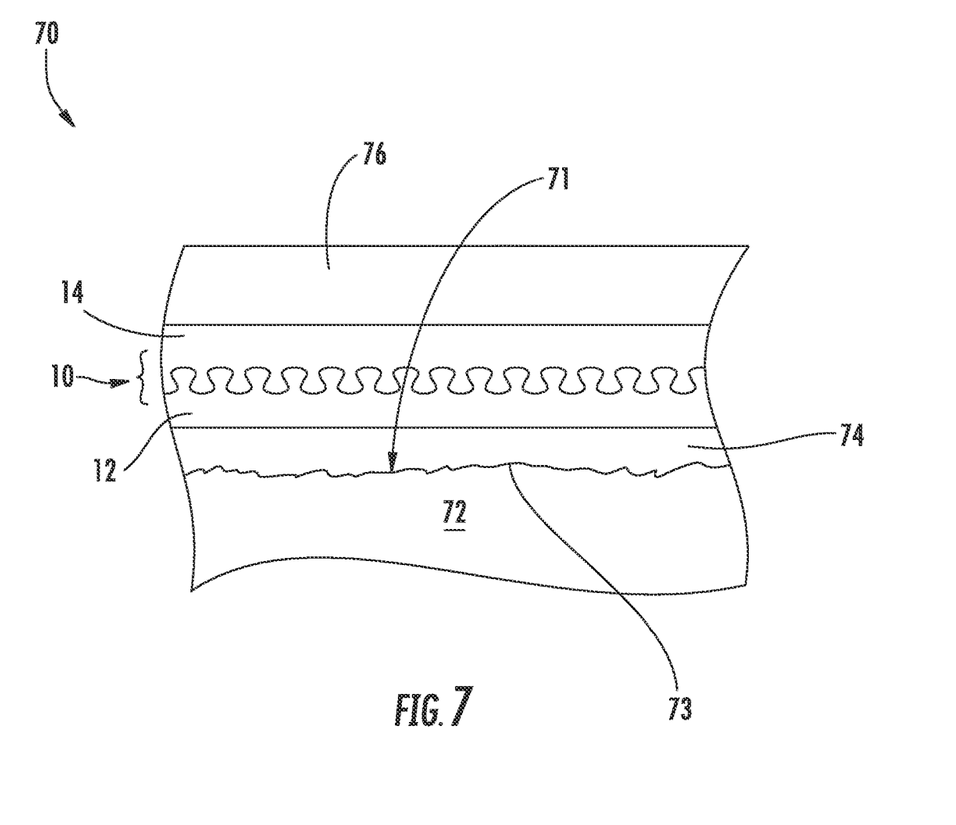
FIG. 7 shows a repaired substrate utilizing an interlocking transition zone.

In one particular embodiment, the interlocking transition zone can be utilized to repair a surface of substrate, particularly a metal substrate. Referring to FIG. 7, a repaired metal substrate 70 is generally shown. A base substrate 72 defines a surface 71 that is in need of repair. The surface 71 is first prepared for repair, which can include cleaning and/or generating groves 73 (e.g., forming groves) into the surface 71 of the metal substrate 72. For example, the groves can be machined into the surface 71 of the substrate. By adding texture to the surface 71 of the metal substrate 72, the surface 71 may be more receptive to additional layers bonded thereon. That is, the surface 71 may have more surface area for fusing to additional coatings and/or layers.

Then, a base layer 72 may be attached to the prepared surface 71 (e.g., cleaned and/or texturized). In one embodiment, the base layer 72 is a metal coating that is welded (e.g., braze welded) onto the prepared surface 71. In one embodiment, the base metal has a composition that is substantially identical as the composition of the metal substrate. Thus, the base coating 72 can form a good braze with the surface 71. The base coating is, in one embodiment formed via additive manufacturing followed by fusing to the surface (e.g., heating, welding, etc.)

Using additive manufacturing, a plurality of first fused layers 14 is then formed on top of the base layer 72, and a plurality of second fused layers 14 is formed on top of the first fused layers 12. An interlocking transition zone 10, such as described above, is formed between the plurality of first layers 12 and the plurality of second layers 14 to undetachably couple the plurality of first layers 12 to the plurality of second layers 14.

Figure 8:
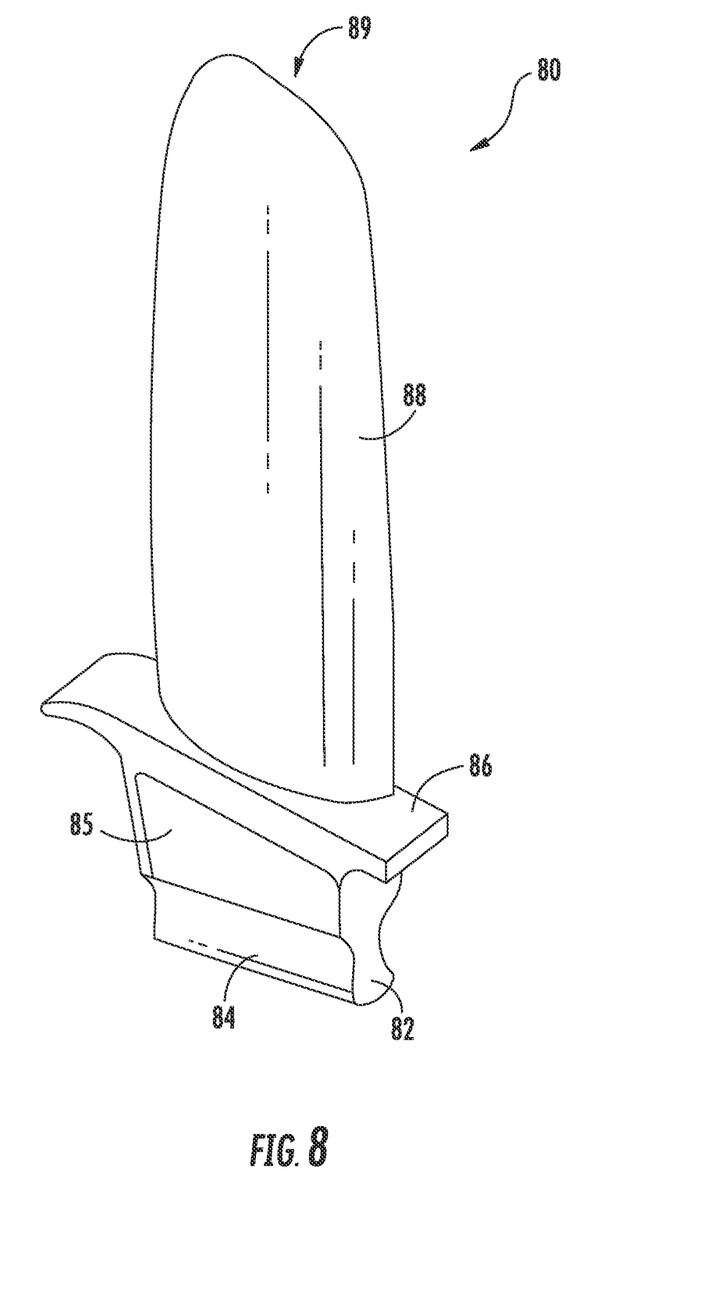
FIG. 8 shows an exemplary turbine blade particularly suitable for the repair method of the present disclosure.

This particular repaired substrate 70 is particularly useful on a turbine fan blade 80, such as shown in FIG. 8, of a gas turbine engine. The blade 80 is generally represented as being adapted for mounting to a disk or rotor (not shown) within the turbine section of an aircraft gas turbine engine. For this reason, the blade 80 is represented as including a dovetail 82 for anchoring the blade 80 to a turbine disk by interlocking with a complementary dovetail slot formed in the circumference of the disk. As represented in FIG. 8, the interlocking features comprise protrusions referred to as tangs 84 that engage recesses defined by the dovetail slot. The blade 80 is further shown as having a platform 86 that separates an airfoil 88 from a shank 85 on which the dovetail 82 is defined.

The blade 80 includes a blade tip 89 disposed opposite the platform 86. As such, the blade tip 89 generally defines the radially outermost portion of the blade 80 and, thus, may be configured to be positioned adjacent to a stationary shroud (not shown) of the gas turbine engine. As stated above, during use, the blade tip 89 may contact the shroud, causing a rub event between the blade tip 89 and the shroud.

In one particular embodiment, the blade tip 89 may be further equipped with a blade tip shroud (not shown) which, in combination with tip shrouds of adjacent blades within the same stage, defines a band around the blades that is capable of reducing blade vibrations and improving airflow characteristics. By incorporating a seal tooth, blade tip shrouds are further capable of increasing the efficiency of the turbine by reducing combustion gas leakage between the blade tips and a shroud surrounding the blade tips.

Because they are directly subjected to hot combustion gases during operation of the engine, the airfoil 88, platform 86 and blade tip 89 have very demanding material requirements. The platform 86 and blade tip 89 are further critical regions of a turbine blade in that they create the inner and outer flowpath surfaces for the hot gas path within the turbine section. In addition, the platform 86 creates a seal to prevent mixing of the hot combustion gases with lower temperature gases to which the shank 85, its dovetail 82 and the turbine disk are exposed, and the blade tip 89 is subjected to creep due to high strain loads and wear interactions between it and the shroud surrounding the blade tips 89. The dovetail 82 is also a critical region in that it is subjected to wear and high loads resulting from its engagement with a dovetail slot and the high centrifugal loading generated by the blade 80.

Figure 9:
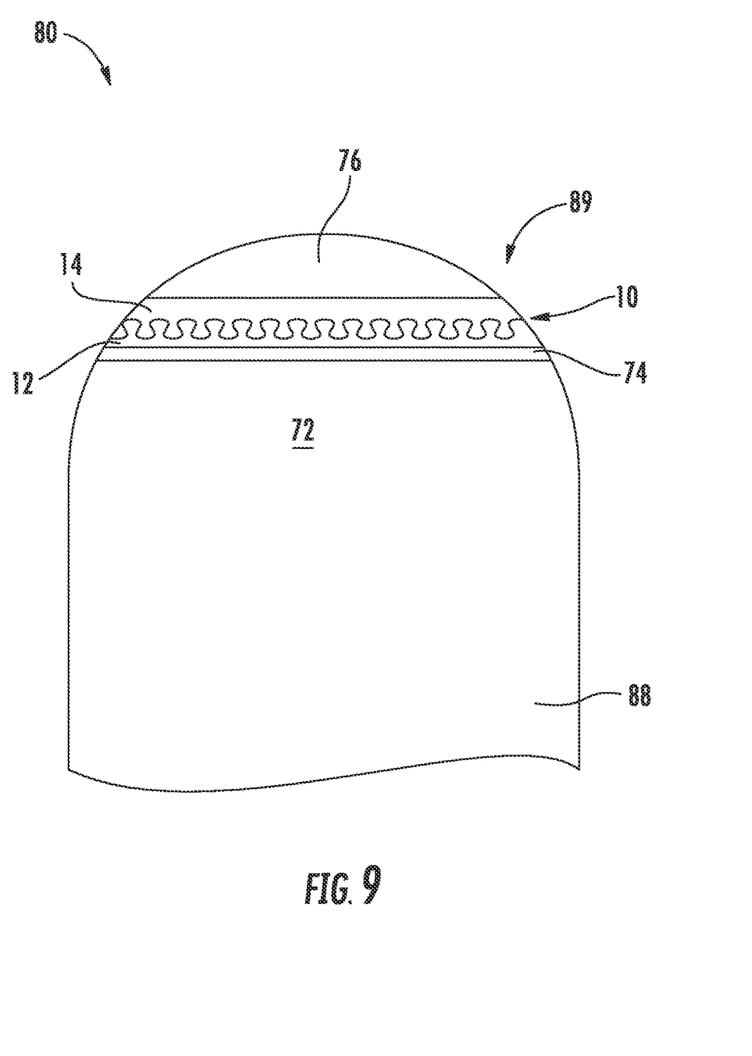
FIG. 9 shows a repaired tip of the exemplary turbine blade of FIG. 8.

FIG. 9 shows a close up of the blade tip 89 after repair through the method described herein. In this embodiment, the fan blade tip 89 is the substrate to be repaired (e.g., after a rub event). That is, the method described with respect to FIG. 7 can be utilized to repair the fan blade tip 89. Utilizing this method, the fan blade tip 89 can be manufactured to specific size requirements in order to control any gap between the fan blade tip 89 and the shroud surface during use.

In one embodiment, each of the plurality of projections of the interlocking transition zone 10 allows relative motion between the first component 12 and the second component 14, such that the second component 14 (i.e., the outer component in the embodiment shown) is retractable when the rotor blade tip 89 contacts an object, such as a shroud.

The above-described additive manufacturing technology enables fabrication of complex objects by joining two or more components by an interlocking transition zone 10. This technology may be advantageously employed to manufacture a variety of components in turbofan 110. For example, as discussed below, the additive manufacturing technology can be used to construct a variety of rotor blades 200 exhibiting improved structural integrity and including performance enhancing features such as protective coatings, flexible joints providing a small range of motion, and joints having integrated cooling holes or passageways. One skilled in the art will appreciate that the below-described embodiments are only examples of components that may be fabricated using the above-described additive manufacturing process, and that other similarly constructed components are within the scope of the invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed:

1. A method of repair for a surface of a metal substrate, comprising:
   preparing the surface of the metal substrate for repair;
   melt attaching a base layer onto the surface of the metal substrate;
   fusing a plurality of first layers of a first material via additive manufacturing to the base coating;
   forming an interlocking transition zone via additive manufacturing from the first material and a second material; and
   fusing a plurality of second layers of the second material via additive manufacturing on the interlocking transition zone,
   wherein the interlocking transition zone comprises a plurality of projections alternately extending from the plurality of first layers and the plurality of second layers, respectively, to undetachably couple the plurality of first layers to the plurality of second layers.

2. The method of claim 1, wherein preparing the surface of the metal substrate for repair comprises generating grooves into the surface of the metal substrate.

3. The method of claim 2, wherein the grooves are machined into the surface of the metal substrate.

4. The method of claim 1, wherein melt attaching a base layer onto the surface of the metal substrate comprises braze welding the base coating onto the surface of the metal substrate.

5. The method of claim 1, wherein the base coating comprises a metal coating.

6. The method of claim 1, wherein the base coating comprises a metal that is identical in composition to the metal substrate.

7. The method of claim 1, wherein the base coating is formed via additive manufacturing.

8. The method of claim 7, wherein the base coating is fused via heat to the surface of the substrate, and
   wherein preparing the surface of the metal substrate for repair comprises cleaning the substrate.

9. The method of claim 8, wherein fusing the plurality of first layers comprises successively depositing layers of the first material to form a first component, and
   wherein the interlocking transition zone is non-planar.

10. The method of claim 9, wherein fusing the plurality of second layers comprises successively depositing layers of the second material to form a second component.

11. The method of claim 10, further comprising:
    forming an additional coating on the second component via additive manufacturing.

12. The method of claim 11, wherein the additional coating includes an environmental barrier coating.

13. The method of claim 1, wherein the second material comprises a thermal barrier coating material.

14. The method of claim 1, wherein the second material comprises a ceramic material.

15. The method of claim 1, wherein the surface defines a blade tip of an airfoil, and wherein the interlocking transition zone is disposed at the tip of the airfoil.

16. The method of claim 15, wherein each of the plurality of projections allows relative motion between the airfoil and the blade tip.

17. A repaired metal substrate, comprising:
    a metal substrate defining a surface;
    a base coating attached to the surface of the metal substrate;
    a first component attached to the base coating, wherein the first component comprises a plurality of fused layers of a first material;
    a second component comprising a plurality of fused layers of a second material; and
    an interlocking transition zone comprising a plurality of projections alternately extending from the first component and the second component, respectively, to undetachably couple the first component and the second component.

18. The repaired metal substrate as in claim 17, further comprising an additional coating on the second component,
    wherein the first component is a turbine blade, and
    wherein the second component is a turbine blade tip shroud, the turbine blade tip shroud further comprising a seal tooth.

19. The repaired metal substrate as in claim 18, wherein the base coating and the metal substrate comprise identical compositions,
    wherein the additional coating on the second component comprises an impact resistant protective coating,
    wherein the interlocking transition zone secures the impact resistant protective coating to the first component,
    wherein the interlocking transition zone is non-planar, and
    wherein the non-planar interlocking transition zone further comprises at least one integrated cooling hole.

20. The repaired metal substrate as in claim 17, wherein each of the plurality of projections allows relative motion between the first component and the second component,
    wherein the first component is a fan blade, the fan blade comprising a fan blade tip,
    wherein the second component is a repaired substrate at the fan blade tip, and
    wherein the repaired substrate is retractable when the fan blade tip contacts an object.

* * * * *